3,761,415
METHOD FOR PHOSPHATE-FREE, SYNTHETIC DETERGENT-BASED CLEANSING COMPOSITION FOR USE THEREIN
Lawrence P. Gould, Syracuse, N.Y., assignor to Aspen Industries Inc., Tully, N.Y.
No Drawing. Filed Oct. 14, 1970, Ser. No. 80,772
Int. Cl. C11d 9/12
U.S. Cl. 252—89                                    5 Claims

ABSTRACT OF THE DISCLOSURE

A method for phosphate-free, synthetic detergent-based cleansing in hard water in the presence of an alkalizing agent wherein the method comprises the addition of a suitable, water soluble, synthetic detergent and a water soluble alkalizing agent to relatively hard water containing significant quantities of at least calcium and magnesium ions wherein a water soluble source of citrate ions have been added to the water in such a form of character that citrate ions are released prior to the release of anion from the alkalizing agent in quantities sufficient to inhibit, to the extent desired, the formation of relatively water insoluble salts derived from the anions of the alkalizing agent.

The method may be practiced by use of a composition which consists essentially of a suitable water soluble synthetic detergent, an alkalizing agent which forms relatively in water insoluble salts with calcium and magnesium ions in hard water, and a water soluble source of citrate ions, the composition being of such a character and in such a form that the citrate ions are released in the water prior to the release of anions from the alkalizing agent in quantities sufficient to inhibit, to the extent desired, the formation of relatively water insoluble calcium and magnesium salts derived from the anions of the alkalizing agent.

BACKGROUND OF THE INVENTION

Phosphates derived from either soap or detergent-based cleansing agents are a primary source of water pollution. Phosphates function as fertilizers for certain marine life which increases so inordinately that rivers and lakes are choked, starved of oxygen and ultimately, ecologically die.

In recent years, synthetic detergents have become the cleanser of choice over ordinary soap and are claimed to have superior surfactant qualities. Nevertheless, the early, aromatic, synthetic detergents were not biodegradable and hence tended to pollute underground sources of water supply. With the advent of biodegradable detergents, that ecological problem seemed well on its way to solution.

Nevertheless, neither the biodegradable detergents nor the non-biodegradable detergents are fully effective as surfactants unless used in an alkaline media. Depending upon whether the detergent is classified as light duty or heavy duty, the pH of the detergent solution should be between approximately 8 to 10.

In order to generate an alkaline media, a variety of alkalizing agents must be employed. The common alkalizing agents are sodium and potassium carbonate and bicarbonate and their hydrates and sodium sesquicarbonate.

The use of alkalizing agents created an additional problem when used in the presence of hard water. Hard water may be broadly defined as a water having substantial quantities of calcium and magnesium ions on the order of approximately 100 parts per million or more. Most municipal water supplies commonly considered hard contain 100 to 125 parts per million. However, in some places the water may contain 200 to 250 parts per million or more.

Calcium and magnesium ions, which are the chief source of hardness in water, form relatively water insoluble salts with the anions of the alkalizing agents mentioned above. These water insoluble salts of calcium and magnesium create turbidity and reduce the cleansing effectiveness of the detergent. In addition, soil redeposition on the clothes being cleansed is increased.

In order to overcome the difficulties generated by the use of synthetic detergents and alkalizing agents in hard water, the industry added phosphates to the cleansing compositions. The phosphates had the effect of tying up the calcium and magnesium ions preventing the formation of water insoluble calcium and magnesium salts of the alkalizing agents and thereby preserving the surfactant qualities of the detergent. However, the increasing use of such synthetic detergent compositions was attended by another serious ecological problem. The inorganic phosphate salts employed as water softeners or conditioners are not destroyed by soil percolation or by the action of bacteria. Rather, these phosphates ultimately find their way into inland water bodies, lakes or streams.

The phosphates are well-known fertilizing agents. Inland waterways, lakes, streams and the like frequently contain both minute marine life such as algae as well as other macroscopic vegetation. The phosphates, acting as a fertilizer, produce the inordinate and excessive growth of both microscopic and macroscopic marine vegetative life. Such proliferation of marine vegetative life, particularly microscopic marine life ultimately chokes the water body starving marine animal life of needed oxygen and ultimately resulting in the ecological death of the water body.

An intensive search has been begun with a view to finding a suitable substitute for inorganic phosphates in synthetic detergent compositions.

A principal object of the present invention is to provide a method for phosphate-free, synthetic detergent-based cleansing in hard water in the presence of alkalizing agents without the formation of water insoluble calcium and magnesium salts.

Another object of the present invention is to provide a phosphate-free, synthetic detergent-based cleansing composition for use in the aforesaid method which has superior foaming and turbidity characteristics in the presence of hard water.

Yet a further object of the present invention is to provide a detergent-based cleansing agent as aforesaid containing a source of citrate ions which are released in water prior to the release of anions from the alkalizing agent in quantities sufficient to inhibit, to the extent desired, the formation of relatively water insoluble salts of calcium and magnesium derived from the anions of the alkalizing agent.

SUMMARY OF INVENTION

A method for phosphate-free, synthetic detergent-based cleansing in hard water in the presence of an alkalizing agent comprising the addition to water of an effective quantity of a water soluble, synthetic detergent, at least one water soluble alkalizing agent selected from the group consisting of sodium and potassium carbonate and bicarbonate and their hydrates and sodium sesquicarbonate, and, at least one water soluble source of citrate ions selected from the group consisting of sodium and potassium citrate and their hydrates and citric acid; the citrate ions being released in the water prior to the release of anions from the alkalizing agent in quantities sufficient to inhibit, to the extent desired, the formation of relatively water insoluble calcium and magnesium salts derived from anions of the alkalizing agent.

PREFERRED EMBODIMENT OF INVENTION

The objects and advantages aforesaid as well as other objects and advantages may be achieved by the methods and compositions hereinafter described.

In essence, the method comprises the release of citrate ions in the hard water prior to the release of anions from the alkalizing agent. The order of addition of the synthetic detergent is optional.

It has been found that the simultaneous release of citrate ions and anions from the alkalizing agent is relatively ineffective to prevent the formation of relatively water insoluble calcium and magnesium salts of the alkalizing agent.

The precise mechanism of the action of citrate ions on calcium and magnesium ions found in hard water is not well understood. However, it is not inconsistent with observation that the citrate ions function in a fashion analogous to a chelating agent. However, in order to function properly, the citrate ions must be released to the water prior to the release of anions from the alkalizing agent.

The particular synthetic detergents to be employed in the method and compositions described and claimed herein is a matter of choice. The common biodegradable and non-biodegradable detergents are well known and need be described no further. As used herein, the word detergent includes all of the aromatic and aliphatic detergents as well as any other non-soap-based surfactant. Nevertheless, the common soaps produced by the action of an alkali on fats or fatty acids such as the sodium and potassium salts of stearic oleic and palmitic acid are not included within the definition of detergents as used herein. Such soaps also involve the problem of the formation of insoluble compounds in hard water but the solution to that problem is different from the solution to the problem of synthetic detergent-based cleansers in hard water.

Since synthetic detergents do not function well unless in an alkaline media, alkalizing agents must be used in combination therewith. The common alkalizing agents in use today are sodium and potassium carbonate and bicarbonate as well as the hydrates thereof and sodium sesquicarbonate. The term "alkalizing agent" as used herein is intended to include anhydrous sodium carbonate, known commonly as soda ash, the monohydrate of sodium carbonate, and the two higher hydrated forms of sodium carbonate, one containing seven water molecules and the other containing ten water molecules, the latter being commonly known as sal soda, as well as sodium sesquicarbonate. The term "alkalizing agent" also includes anhydrous potassium carbonate and the hydrate of potassium carbonate.

The term "source of citrate ions" includes sodium citrate in all hydrated forms, potassium citrate and citric acid, either anhydrous or hydrated.

A sound, quantitative test of the effectiveness of water softening agents comprises the mixing of a detergent in hot water with an alkalizing agent, shaking until a foam is generated and thereafter measuring the foam and turbidity over a period of time. A lowered foam and higher turbidity indicates the formation of water insoluble salts, principally the calcium and magnesium salts of the alkalizing agent.

EXAMPLE I

As a control, 0.1 gram of an aromatic synthetic detergent was mixed with 473 grams of hot water and 3.98 grams of anhydrous soda ash. The solution was mixed and then divided in half. To one half of the mixture, 8.15 grams of sodium citrate were added. Both test samples were then shaken to generate a foam.

The test sample having no sodium citrate exhibited a turbidity of 50 parts per million immediately after shaking with a foam having a depth of one-half inch. After 25 minutes, the first test sample still exhibited 50 parts per million turbidity and the foam had reduced to ¼ inch.

The second test sample to which sodium citrate was added exhibited a turbidity of 5 parts per million and 1 inch foam immediately after shaking. After a period of 25 minutes, both the turbidity and foam depth remained the same.

EXAMPLE II 0.1 gram of the same synthetic detergent as in Example I was added to the same 473 grams of hot water as well as 16.3 grams of sodium citrate. The solution was mixed and divided in half to provide two identical test samples.

To the first test sample, two grams of anhydrous sodium carbonate were added. Nothing was added to the second test sample. Both test samples were shaken.

The test sample having no sodium carbonate exhibited no turbidity both immediately after shaking and 15 minutes thereafter. This sample exhibited a foam of ⅝ inch in depth immediately after shaking and $9/16$ of an inch in depth 15 minutes thereafter.

The second sample containing anhydrous sodium carbonate exhibited 0 part per million turbidity immediately after shaking and 15 minutes thereafter. That sample also exhibited a foam depth of $15/16$ of an inch immediately after shaking and $13/16$ of an inch 15 minutes thereof.

In the case of both Examples I and II, the water contained 110 parts per million hardness measured as calcium carbonate. Substantially, the same tests were conducted as set forth in Examples I and II employing water having approximately 230 parts per million hardness with substantially the same results.

An examination of Example I discloses extremely high turbidity and relatively low foam in detergent solutions containing an alkalizing agent and hard water. The mere addition of sodium citrate after dissolution of the alkalizing agent reduced turbidity and increased the depth of foam but did not create an acceptable solution. The desiderata is not more than approximately 2 parts per million turbidity.

Example II discloses that the prior addition of citrate ions in sufficient quantities eliminated the problem of turbidity derived from calcium and magnesium salts of the alkalizing agent in hard water. There was a substantial and significant improvement of turbidity over Example I in which soidum citrate was added after the alkali had dissolved.

EXAMPLE III

In order to determine the effect of increasing quantities of sodium carbonate, a solution containing 473 grams of hot water, 4.0 grams of soidum citrate and 0.1 gram of the same synthetic detergent were prepared to which 4.0 grams of anhydrous sodium carbonate were thereafter added. This solution was shaken and exhibited a turbidity of 100 parts per million.

The water contained approximately 110 parts per million hardness. The conclusion to be drawn is that in a water solution containing approximately 110 parts per million hardness equal concentrations of sodium carbonate and sodium citrate are not sufficient to inhibit the formation of water insoluble salts of calcium and magnesium with cations of the alkalizing agent.

EXAMPLE IV

In order to demonstrate the effect of increasing the relative proportions of citrate to alkalizing agent, a solution of 473 grams of hot water, 12.0 grams of sodium citrate and 0.1 gram of the same synthetic detergent were prepared. To this mix, 6 grams of anhydrous soidum carbonate were added and the solution shaken. This solution exhibited a turbidity of 2 parts per million immediately after shaking which increased to 5 parts per million thirty minutes thereafter.

In Example IV the water had approximately 230 parts per million hardness. The results obtained were marginal and, in the light of the teachings of this invention, unacceptable.

EXAMPLE V

In order to determine the effect of reducing the overall concentration of both the citrate and sodium carbonate, a mix was prepared containing 473 grams of hot water having a hardness of approximately 230 parts per million, 8.1 grams of soidum citrate and 0.1 gram of the same synthetic detergent as used in the other examples. To this mix 4.0 grams of anhydrous soidum carbonate were added and the solution shaken. Immediately after shaking, this test sample exhibited 0 part per million turbidity and a foam ⅝ of an inch in depth.

In Examples IV and V the ratio of citrate to soda ash was approximately 2:1. However, in Example V the total concentration of both the citrate and soda ash were lower and is preferred because of the lack of turbidity and the appearance of a moderate foam.

EXAMPLE VI

In order to determine the effect of increasing the amount of soda ash, two tests were conducted, the first as a control and the second to determine the effect of increasing the amount of soda ash.

In the first or control test 0.1 gram of the same synthetic detergent as used in the other examples was added to 473 grams of hot water having 230 parts per million hardness as well as 4.7 grams of anhydrous citric acid. To this solution 3.5 grams of anhydrous soda ash were added and the solution shaken. Immediately after shaking, there was 0 part per million turbidity and a foam of 3/16 of an inch. Forty minutes later, the turbidity remained at 0 part per million and ¼ of an inch foam was observed.

Test sample VI exhibited acceptable results and demonstrated the relative interchangeability of sodium citrate and citric acid as sources of citrate ions.

The second test sample was prepared with 237 grams of hot water having the same 230 parts per million hardness but only 2.36 grams hydrated citric acid. To this solution 6.5 grams soda ash were added. The solution was shaken and immediately after shaking a turbidity of 0 part per million was observed together with a foam of ¼ inch in depth. However, 40 minutes later a turbidity of 100 parts per million was observed with a foam of ⅛ of an inch in depth.

The conclusion to be drawn from Example VI is that the increased concentration of soda ash tends to increase the turbidity with time. The second test sample of Example VI involves concentrations which are not recommended and do not produce acceptable results.

EXAMPLE VII

In order to further investigate the effect of relative concentrations of soda ash to the source of citrate ions, 473 grams of hot water having a hardness of 230 part per million were mixed with 2.37 grams of anhydrous citric acid and 0.1 gram of the same synthetic detergent as employed in the other examples. To this mixture 4.73 grams of soda ash were added.

After shaking a turbidity of 0 part per million and a foam of ¾ of an inch were observed. After 30 minutes the turbidity remained the same at 0 part per million and the foam decreased slightly to ⅝ of an inch in depth.

The same experiment was conducted with water having 110 parts per million hardness with substantially the same results.

In an additional test the same solutions were prepared as in Example VII reversing the order of addition of citric acid and soda ash so that the soda ash was added first. A turbidity of over 100 parts per million was observed in each case.

Generally speaking in dealing with water having approximately 110 parts per million hardness, a preferred composition includes 1% soda ash and 0.5% citric acid in relation to the water. Nevertheless, the amount of soda ash and citric acid to water depends at least in part upon the hardness of the water, the limit of acceptable turbidity and the desired pH of the resulting solution. In this regard, it should be borne in mind that, depending upon whether the detergent is characterized as light duty or heavy duty, the pH can vary from approximately 8 to 10 or higher.

There are many ways of performing the method described herein. The desiderata is the addition of sufficient quantities of citrate ions to the water prior to the addition of anions from the alkalizing agent. In order to accomplish this desiderata, many expedients may be employed. For instance, the source of citrate ions may be added separate and distinct from the alkalizing agent and the source of citrate ions added to the water first. However, this mechanically complicated and generally undesirable.

A tablet may be employed which comprises an outer layer of the source of citrate ions and an inner body of the alkalizing agent.

If a granular or powder material is desired, the citric acid may appear in a form and charcter that will enter into solution more rapidly than the alkalizing agent. The alkaizing agent may be sprayed with a solution-retardant for this purpose.

Nevertheless, a very inexpensive, easily prepared dry mix can be prepared which functions well to permit desired quantities of citric acid to dissolve first before the soda ash employed as an alkalizing agent.

The dry mix comprises a suitable solid detergent in any concentration which appears economical and effective in reasonable quantities. Anhydrous citric acid is preferred as the source of citrate ions because hydrated citric acid effloresces and would generate a mechanical packaging probem. Anhydrous citric acid is commercially available in a relatively fine granular form. Anhydrous soda ash is also included in the dry mix. It has been found that in such a composition, the citric acid dissolves much more rapidly than the soda ash notwithstanding the fact that they are added to the water simultaneously between temperatures of approximately 33° C. to 108° C.

In addition, when anhydrous soda ash is employed as the alkalizing agent, a hydration reaction occurs first before the soda ash dissolves. The finite period of time required for the hydration reaction provides additional time for the citric acid to dissolve first. Moreover, in preferred compositions, there is less citric acid which also helps to insure full dissolution before substantial or significant quantities of the soda ash dissolve.

EXAMPLE VIII

A dry mix containing 2.37 grams of anhydrous citric acid, 4.3 grams of soda ash and 0.1 gram of the same synthetic detergent were prepared as a dry mix with a suitable filler. The dry mix was added to 473 grams of hot water having a hardness of approximately 320 parts per million resulting in 0 part per million turbidity and a foam of approximately ¾ of an inch immediately after shaking. The turbidity remained at 0 part per million after 30 minutes and the foam reduced slightly to ⅝ of an inch.

An experiment with the same dry mix in the same quantity of hot water having a hardness of 110 parts per million was made with similar results.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention.

I claim:

1. A method for phosphate-free, synthetic detergent-based cleansing in hard water in the presence of an alkalizing agent comprising:

(a) the addition to water of an effective quantity of a water soluble, synthetic detergent, at least one water soluble alkalizing agent selected from the group consisting of sodium and potassium carbonate and their hydrates, sodium and potassium bicarbonate and sodium sesquicarbonate, and at least one water soluble source of citrate ions, selected from the group consisting of sodium and potassium citrate and their hydrates and citric acid and its hydrate, (b) the citrate ions being released in the water prior to the release of anions from the alkalizing agent in quantities sufficient to inhibit, to the extent desired, the formation of relatively water insoluble salts derived from anions of the alkalizing agent.

2. A method for phosphate-free, synthetic detergent-based cleansing in hard water in the presence of an alkalizing agent comprising:
   (a) the procedure in accordance with claim 1 in which
   (b) the alkalizing agent appears in quantities sufficient to produce an aqueous solution having a pH between approximately 8 to 10.

3. A method for phosphate-free, synthetic detergent-based cleansing in hard water in the presence of an alkalizing agent comprising,
   (a) the procedure in accordance with claim 2 in which
   (b) the alkalizing agent appears in proportions of no greater than approximately 1% of the water by weight.

4. A method for phosphate-free, synthetic detergent-based cleansing in hard water in the presence of an alkalizing agent comprising:
   (a) the procedure in accordance with claim 1 in which,
   (b) the water, alkalizing agent and source of citrate ions appear in relative quantities just sufficient to result in a turbidity approximately 30 minutes after mixing of no greater than approximately 2 parts per million when the water contains no more than approximately 110 parts per million hardness measured as calcium carbonate.

5. A method for phosphate-free, synthetic detergent-based cleansing in hard water in the presence of an alkalizing agent comprising:
   (a) the addition to water of an effective quantity of a water soluble, synthetic detergent, at least one water soluble alkalizing agent selected from the group consisting of sodium and potassium carbonate and their hydrates, and water soluble citric acid,
   (b) citrate ions being released in the water prior to the release of anions from the alkalizing agent in quantities sufficient to inhibit, to the extent desired, the formation of relatively water insoluble salts derived from anions of the alkalizing agent,
   (c) the citric acid appearing in proportions of no less than approximately one half of the weight of the alkalizing agent.

References Cited

UNITED STATES PATENTS 2,264,103   11/1941   Tucker _____ 252—132 X

OTHER REFERENCES

"Reduction of Phosphate Builder in Tallow-Based Detergent Formulation," Journal of the American Oil Chem. Soc., vol. 48, No. 2, pp. 74–76.

MAYER WEINBLATT, Primary Examiner

U.S. Cl. X.R.

252—132, 137, 156

UNITED STATES PATENT OFFICE
CERTIFICATE OF CORRECTION

Patent No. 3,761,415       Dated 9/25/73

Inventor(s) LAWRENCE P. GOULD

It is certified that error appears in the above-identified patent and that said Letters Patent are hereby corrected as shown below:

Column 4, line 24, "thereof" should be --thereafter--.

Column 4, line 49, "soidum" should be --sodium--.

Column 4, line 67, "soidum" should be --sodium--.

Column 5, line 6, "soidum" should be --sodium--.

Solumn 5, line 8, "soidum" should be --sodium--.

Column 5, line 54, "part" should be --parts--.

Column 6, line 14, "this mechanically complicated" should be --this is mechanically complicated--.

Column 6, line 33, "probem" should be --problem--.

Column 6, line 54, "320" should be --230--.

Signed and sealed this 19th day of February 1974.

(SEAL)
Attest:

EDWARD M. FLETCHER, JR.
Attesting Officer

C. MARSHALL DANN
Commissioner of Patents